United States Patent [19]

Higuchi et al.

[11] Patent Number: 4,795,569
[45] Date of Patent: Jan. 3, 1989

[54] METHOD FOR DRY FRACTIONATION OF FATTY MATERIAL

[75] Inventors: Kiyoyuki Higuchi, Sennan; Hirokazu Maeda; Hiroshi Hidaka, both of Sakai; Hiroshi Iwasa, Sennan; Yoshitaka Ebihara, Yao; Kazuhito Asahara, Sennan; Hayato Kubota, Izumi, all of Japan

[73] Assignee: Fuji Oil Company, Limited, Osaka, Japan

[21] Appl. No.: 76,548

[22] Filed: Jul. 22, 1987

[30] Foreign Application Priority Data

Aug. 4, 1986 [JP] Japan ............................ 61-183670

[51] Int. Cl.$^4$ ............................................. E01D 17/00
[52] U.S. Cl. ..................................... 210/770; 210/774
[58] Field of Search ............... 210/350, 767, 768, 770, 210/774; 100/2, 3, 35, 38, 92, 299

[56] References Cited

U.S. PATENT DOCUMENTS 4,061,575 12/1977 Randle .............................. 210/350

Primary Examiner—Frank Sever
Attorney, Agent, or Firm—Wenderoth, Lind & Ponack

[57] ABSTRACT

A method for dry fractionation of a fatty material which comprises cooling the fatty material and then fractionating the material into a solid fraction and a liquid fraction, said cooling being carried out by introducing the fatty material in a fluid state into a filter chamber of a filter apparatus having pressing function and maintaining the fat material therein at a crystal deposition temperature until a predetermined amount of crystals are formed, and said fractionation being carried out by pressing the filter chamber to fractionate the fat material into the solid fraction and the liquid fraction.

4 Claims, 2 Drawing Sheets

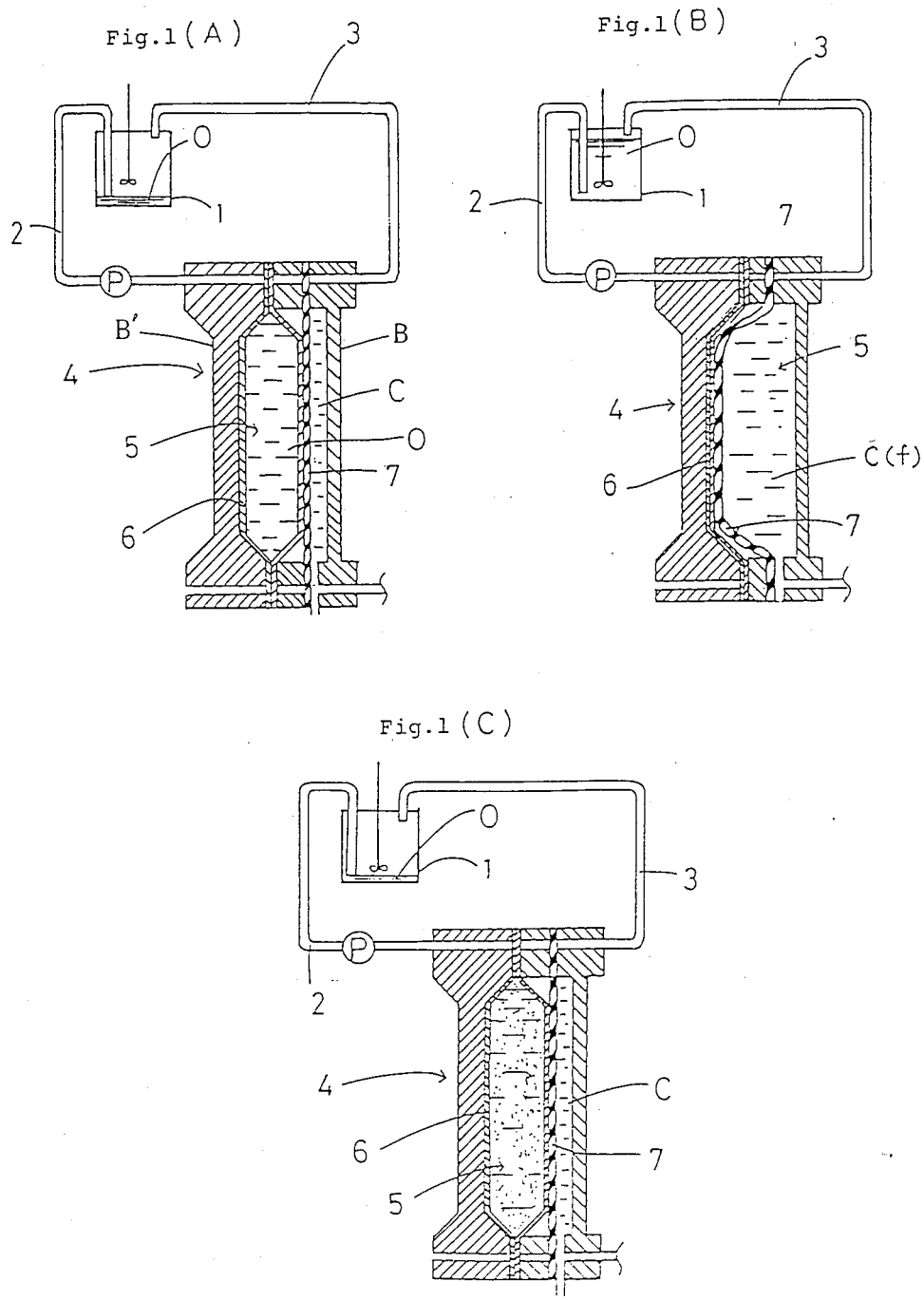

METHOD FOR DRY FRACTIONATION OF FATTY MATERIAL

FIELD OF THE INVENTION

The present invention relates to a method for dry fractionation of a raw fatty material composed of various components having different melting points by utilizing the difference in melting points.

BACKGROUND OF THE INVENTION

As a method for fractionation of a fatty material into fractions having different melting points, solvent fractionation using a solvent such as acetone, hexane or the like has been known for long. Although fractionation can be effected precisely, this method is dangerous because a flammable solvent should be used and further this method is not preferred in view of industrial hygiene because the solvent uppers are detrimental to health. In addition, this method requires high production cost because of an increase in cost of a solvent consumed, heat energy cost for solvent recovery and installation cost of a solvent recovery apparatus.

As another fractionation method, emulsion fractionation using a surfactant is also known. However, this method has the a defect of low fractionation efficiency (yield and quality). In addition, post-treatment for separating a fat or oil from an aqueous solution containing a surfactant is complicated, and a big apparatus and high cost are required for treating waste water containing a surfactant.

As still another fractionation method, winterization has been known for long time. In this method, a solvent or surfactant is not used, and a fat or oil molten with heating is allowed to stand in a cooling tank at about 0° C. to separate a lower solid layer from an upper liquid layer. This method requires many cooling tank facilities and takes several days until completion of fractionation. Therefore, productivity is low and fractionation efficiency is inferior to those of the above two methods.

Recently, in order to eliminate defects of these known fractionation methods, there has been proposed a fractionation method which comprises adding a hardened oil having a melting point of 55° to 75° C. as seeding crystals to a fat or oil molten with heating to accelerate crystallization, aging the mixture and filtering the mixture (Japanese Patent Kokoku No. 56-15759). This method is applicable when the amount of crystals after aging is relatively small (i.e., when a yield of a desired solid fraction is low). However, when an amount of crystals becomes larger, pumping of crystals becomes difficult and therefore handling thereof takes much time.

Further, as a method for fractionation of a fraction which is compatible with cacao butter from a vegetable fat such as mango kernel oil or sal fat, there has been proposed a dry fractionation method of a fat which comprises adding β or β' crystals obtained from a kernel fat or cacao fat as seed crystals to a vegetable fat molten with heating, aging the mixture to form the desired stable crystals, gradually cooling to a fractionation temperature to grow crystals and filtering the mixture under pressure (Japanese Patent Kokai No. 60-101197). However, in this dry fractionation method, the resulting crystal aggregate has a paste-like consistency. Therefore, in order to effect fractionation, the paste-like crystal aggregate should be transferred from a tank or tray into bags suitable for filtration by pressing and the bags are piled up in a press to apply a pressure from the top to squeeze out a liquid fraction. This takes much time and requires a great deal of labor.

OBJECTS OF THE INVENTION

The main object of the present invention is to eliminate the above defects of known fractionation methods. For this purpose, the present invention provides a novel dry fractionation method which has high fractionation efficiency and does not require a great deal of labor.

This object as well as other objects and advantages of the present invention will become apparent to those skilled in the art from the following description with reference to the accompanying drawings.

SUMMARY OF THE INVENTION

Figure 1:
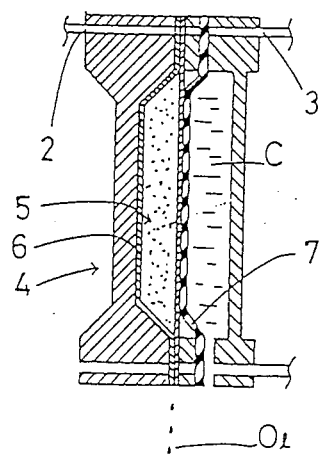
FIGS. 1(A) to 1(E) are schematic cross sections of a vertical membrane type filter press illustrating each step of the method of the present invention.
Figure 1:
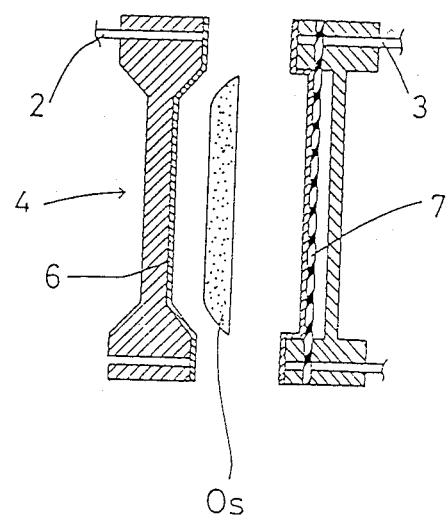

According to the present invention, there is provided a method for dry fractionation of a fatty material which comprises cooling the fatty material and then fractionating the material into a solid fraction and a liquid fraction, said cooling being carried out by introducing the fatty material in a fluid state into a filter chamber of a filter apparatus having a pressing function and maintaining the fat material therein at a crystal deposition temperature until a predetermined amount of crystals are formed, and said fractionation being carried out by pressing the filter chamber to fractionate into the solid fraction and the liquid fraction.

That is, basically, the present invention is characterized by deposition of crystals in a filter chamber and pressing of a cake formed in the chamber to separate into a crystalline fraction (solid fraction) and a liquid fraction.

By the method of the present invention, it is possible to carry out fractionation of a fatty material efficiently without danger and problems in industrial hygiene due to the use of a flammable solvent.

DETAILED DESCRIPTION OF THE INVENTION

The fatty material to be fractionated in the present invention includes fats and oils such as animal fats, for example, tallow, lard and the like; vegetable fats, for example, palm oil, shea fat, sal fat, mango kernel oil, coconut oil, palm kernel oil and the like; various synthetic fats and oils: their hardened oils and fractional hardened oils; waxes: a mixture thereof; and the like.

The method of the present invention is carried out by using a filter apparatus having a pressing function.

Unlike a common solid-liquid separation, deposition of a crystalline fraction from the fatty material depends upon a temperature. Further, in order to carry out fractionation precisely, a deposition rate should be as low as possible. Therefore, a filter apparatus to be used is preferably a batch-wise apparatus and, for treating a large amount of a fatty material, it is preferred to use a filter press having many filter chambers arranged in parallel with each other, particularly, a so-called variable-volume type or membrane type filter press wherein a filter chamber is pressed with a pressure resistant rubber diaphragm under static pressure. A filter apparatus of this type has a thin filter chamber such as several ten mm in thickness and a large heat transfer area, which facilitates temperature control. In addition, even if the volume of each chamber is small, it is possible to treat several tons to several ten tons of the fatty material at once by arranging many chambers in parallel with each other. Thus, such a filter apparatus is suitable for industrial practice of the present invention. However, there can be also used other types of filter apparatus, for example, X-press filter, automat press, tube press, VC filter, piston press and the like.

In the method of the present invention, a fat material in a fluid state is introduced into a filter chamber and is maintained at a crystal deposition temperature until a predetermined amount of crystals is deposited.

One feature of the present invention is to utilize the filter chamber itself as a container for deposition of a solid fat by sealing a filter surface in the filter chamber with coagula of the fat material to be treated. This sealing can be effected by covering the filter surface with coagula of the fat material to form a sealing layer on the filter surface. In practice, this can be most readily effected by impregnating a filter medium which constitutes the filter surface with the fatty material and cooling the filter medium at a temperature lower than a solidifying point of the fatty material to form a sealing layer. In this way, as long as the temperature of the fatty material is not so high, there is no possibility that the sealing layer is broken when the fatty material is introduced into the filter chamber.

After maintaining the fatty material in the filter chamber at a crystal deposition temperature, the filter chamber is pressed to break the sealing layer. Thereby, a liquid fraction flows out of the filter chamber, while a cake (crystalline fraction) remains in the filter chamber. Thus, fractionation is completed.

Now, a preferred embodiment of the method of the present inention is illustrated with reference to the accompanying FIGS. 1(A) to 1(E) wherein a vertical membrane type filter press having a diaphragm pressing means is used.

As shown in FIGS. 1(A) and 1(B), the filter press (4) has two filter cloths (6) held between body members (B) and (B') of the filter press which form a filter chamber (5). Between the two filter cloths (6), a fatty material to be treated (O) is introduced through a conduit (2) by means of a pump (P). The conduit (2) is connected to a tank (1) which can heat or cool the fatty material (0). The material between the filter cloths (6) can be returned to the tank (1) through the conduit (3). One filter cloth is contacted with a diaphragm (7). A refrigerant such as cold water at 0° to 30° C. is introduced into the space between the diaphragm (7) and one body member (B) by a refrigerant supply means (not shown) to swell the diaphragm (7). When the diaphragm (7) is swelled, the material (O) between two filter cloths is pressed to filter through the filter cloths (6).

Firstly, the fatty material (0) is molten with heating in a tank and introduced between the two cloths (6) in the filter chamber (5) through the conduit (2) to impregnate the filter cloths (6) with the material [see FIG. 1(A)].

Then, the material is returned to the tank (1) through the conduit (3) and the refrigerant is introduced into the space between the diaphragm (7) and the body member (B). The pressure of the refrigerant is raised to swell the diaphragm (7) to contact with the filter cloths (6). Thereby, the material impregnated in the filter cloths (6) is cooled with the refrigerant (C(f)) through the diaphragm (7) to solidify the material [see FIG. 1(B)]. In this case, the temperature of the refrigerant (C(f)) is maintained at several to several ten degrees centigrade lower than a fractionation temperature of the material (i.e., a temperature to be maintained in a subsequent fractionation of the material) to prevent passage of the material to be subsequently introduced into the filter chamber through the filter cloths.

Subsequently, the fatty material (O) in the tank (1) is cooled to a crystal deposition temperature (e.g., at 5° to 40° C.) while maintaining its fluid state and is introduced into the filter chamber (5) through the conduit (2). The material is maintained in the chamber at a fractionation temperature (e.g., at 0° to 40° C.) [see FIG. 1(C)]. In case of introducing the material, most preferably, the fatty material is in such a state as just before initiation of crystal deposition. However, the fatty material in such a state that crystals are somewhat deposited, particularly, about 20% or less, preferably, about 5% or less of total crystals are deposited can be also preferred. When the amount of crystals deposited in the material to be treated is too much, crystals having good pressing efficiency are hardly obtainable.

Then, at the fractionation temperature, the fatty material (O) in the filter chamber (5) is maintained until a predetermined amount of crystals (e.g., corresponding to 30 to 90% by weight based on the total amount of the fatty material) is deposited. Under normal conditions, it is necessary to cool the filter chamber during this step to prevent a rise in temperature of the fatty material due to heat transfer from the outside. It is desired that the temperature of the refrigerant to be introduced for this purpose should be, at lowest, 15° C. lower than the fractionation temperature of the fatty material. When the temperature difference is too much, local supercooling is caused and even a low melting point fraction is crystallized, which results in decrease in precision of fractionation.

When the predetermined amount of crystals is deposited, the solid-liquid mixture is pressed by swelling the diaphragm with the pressurized refrigerant (C) to fractionate into a cake (solid fraction) (Os) and a filtrate (liquid fraction) (Ol). Usually, the mixture is maintained for a certain period of time, at a pressure of 5 to 100 kg/cm² [see FIG. 1(D)].

Then, the filter press (4) is opened, and the cake (Os) is removed from the filter cloth [see FIG. 1(E)].

The steps illustrated hereinabove are for a first cycle of the operation and, in a second and subsequent cycles, impregnation of the filter cloths with the molten fatty material and solidification thereof are not required.

The method of the present invention is suitable for obtaining high melting point and low melting point fractions in high quality from fatty materials, for example, fats and oils such as animal fats, for example, tallow, lard and the like; vegetable fats, for example, palm oil, shea fat, sal fat, mango kernel oil, coconut oil, palm kernel oil and the like: various synthetic fats and oils: their hardened oils and fractional hardened oils; waxes; a mixture thereof: and the like. Particularly, the method of the present invention is suitable for obtaining a hard butter fraction in high quality. Especially, the method of the present invention is suitable for fractionation of a large amount of a crystal fraction. For example, according to the method of the present invention, a large amount of a crystal fraction such as more than 30% of a crystal fraction can be fractionated in high precision from a fatty material such as palm kernel oil only by cooling. Further, the method of the present invention is economical because the apparatus used in the present invention is that having only a tank and a filter having a pressing means, which requires very low cost for the facility, and unattended operation is possible.

The following Examples and Reference Examples further illustrate the present invention in detail but are not to be construed to limit the scope thereof. In the Examples and Reference Examples, all "%'s" and "parts" are by weight unless otherwise stated.

EXAMPLE 1

Deacidified palm kernel oil having a clear melting point of 31° C. (fatty material) was placed in a tank and molten with heating at about 50° C. The oil was introduced into filter chambers of a membrane type vertical filter press having 20 filter chambers to thoroughly impregnate the filter cloths in the chambers with the oil. The oil was returned to the tank, and cold water at about 20° C. was introduced in the space between a diaphragm and a body member of the filter press to cool the filter chamber and filter cloths to solidify the impregnated palm kernel oil to form a sealing layer.

On the other hand, palm kernel oil in the tank was cooled with stirring to about 25° C. and then introduced between the filter cloths having the sealing layer in the cooled filter chamber. The palm kernel oil was maintained in the filter chamber for 90 minutes, while cold water at 20° C. was circulated through the space between the diaphragm and the body member.

Then, an outlet valve of the diaphragm was closed and a pressure of 5 kg/cm$^2$ was applied. The pressure was gradually increased up to 50 kg/cm$^2$ and the filter chamber was maintained in this state for additional 90 minutes to press the crystallized oil to squeeze out a liquid fraction. After pressing, the filter press was opened and a cake (solid fraction) in the filter chamber was scaled off and recovered.

The properties and yield ratio of the solid and liquid fractions thus obtained are as show in Table 1.

TABLE 1

|  | Acid value | Iodine value | Melting point (°C.) | Yield ratio |
| --- | --- | --- | --- | --- |
| Fatty material | 0.49 | 17.7 | 28.2 | — |
| Liquid fraction | 0.81 | 28.9 | 17.3 | 49.8 |
| Solid fraction | 0.17 | 6.58 | 32.1 | 50.2 |

The solid fraction has the following solid fat index (SFI) which shows that the fraction is in excellent quality as a hard butter.

| SFI | | |
| --- | --- | --- |
| 5° C.: 68.8 | 22.5° C.: 64.8 | 32.5° C.: 7.9 |
| 10° C.: 68.5 | 25° C.: 60.4 | 35° C.: 0.0 |
| 15° C.: 68.0 | 27.5° C.: 53.3 |  |
| 20° C.: 66.5 | 30° C.: 37.7 |  |

EXAMPLE 2

Shea fat treated with ethanol (fatty material) was placed in a tank and molten with heating at about 50° C. According to the same manner as described in Example 1, the fat was introduced into filter chambers to thoroughly impregnate the filter cloths in the chambers with the fat. The fat was returned to the tank, and cold water at about 20° C. was introduced in the space between the diaphragm and the body member of the filter press to cool the filter chamber and filter cloths to solidify the impregnated shea fat to form a sealing layer.

On the other hand, shea fat in the tank was cooled with stirring to about 25° C. and then introduced between the filter cloths having the sealing layer in the cooled filter chamber. The fat was maintained in the filter chamber for 4 hours, while cold water at 20° C. was circulated through the space between the diaphragm and the body member to thoroughly crystallize the fat in the chamber.

Then, a pressure was gradually applied up to 30 kg/cm$^2$ and the filter chamber was maintained in this state for additional 30 minutes to press the crystallized fat to separate a liquid fraction. After pressing, the filter press was opened and a cake (solid fraction) in the filter chamber was scaled off and recovered.

The properties and yield ratio of the solid and liquid fractions thus obtained are as show in Table 2.

TABLE 2

|  | Iodine value | Melting point | Yield ratio (°C.) |
| --- | --- | --- | --- |
| Fatty material | 54.5 | 32.5 | — |
| Liquid fraction | 70.3 | 14.8 | 45.7 |
| Solid fraction | 41.5 | 38.2 | 54.3 |

A mixture of the above-obtained shea fat solid fraction and palm mid fraction (50:50) which is refined according to a conventional method has the following solid fat index (SFI), and a chocolate produced by using the mixture shows excellent tempering properties and heat resistance.

| SFI | | |
| --- | --- | --- |
| 5° C.: 82.5 | 22.5° C.: 76.9 | 32.5° C.: 19.4 |
| 10° C.: 82.0 | 25° C.: 74.4 | 35° C.: 0.0 |
| 15° C.: 81.1 | 27.5° C.: 65.1 |  |
| 20° C.: 79.0 | 30° C.: 50.0 |  |

EXAMPLE 3

Soft palm oil having an iodine value of 56.9 (fatty material) was placed in a tank and molten with heating at about 50° C. According to the same manner as described in Example 1, the oil was introduced into filter chambers of a membrane type vertical filter press to thoroughly impregnate the filter cloths in the chambers with the oil. The oil was returned to the tank, and cold water at about 10° C. was introduced in the space between a diaphragm and a body member of the filter press to cool the filter chamber and filter cloths to solidify the impregnated soft palm oil to form a sealing layer.

On the other hand, palm kernel oil in the tank is cooled with stirring to about 15° C. and then introduced between the filter cloths having the sealing layer in the cooled filter chamber. The soft palm oil was maintained in the filter chamber for about 3 hours, while cold water at 13° C. was circulated through the space between the diaphragm and the body member to thoroughly crystallize the oil.

Then, pressure was gradually applied up to 25 kg/cm$^2$ and the filter chamber was maintained in this state for additional 50 minutes to press the crystallized oil to separate a liquid fraction. After pressing, the filter press was opened and a cake (solid fraction) in the filter chamber was scaled off and recovered.

The properties and yield ratio of the solid and liquid fractions thus obtained are as shown in Table 3.

TABLE 3

|  | Iodine value | Melting point (°C.) | Yield ratio |
|---|---|---|---|
| Fatty material | 56.9 | 20.2 | — |
| Liquid fraction | 67.8 | — | 53.3 |
| Solid fraction | 44.1 | 27.2 | 46.7 |

The liquid fraction has a cloud point of −1° C. which shows that the fraction is of excellent quality as a raw material for a salad oil.

REFERENCE EXAMPLE 1

According to the same manner as described in Example 1, fractionation of palm kernel oil was carried out except that formation of the sealing layer by impregnation of the filter cloths with the oil was not effected. In this case, since the oil introduced into the filter chamber leaked out through meshes of the filter cloths, only about 70% of a desired amount of the oil was introduced into the filter chamber. Further, the outlet of the filter press was clogged, which resulted in low precision of fractionation. And, the fractionated solid fraction had low heat resistance and was in inferior quality as a hard butter. The properties and yield ratio are shown in Table 4.

TABLE 4

|  | Iodine value | Melting point (°C.) | Yield ratio |
|---|---|---|---|
| Fatty material | 17.7 | 28.0 | — |
| Liquid fraction | 28.6 | 17.8 | 42.0 |
| Solid fraction | 9.80 | 30.9 | 58.0 |

REFERENCE EXAMPLE 2

According to the same manner as described in Example 1, fractionation of palm kernel oil was carried out except that palm kernel oil in the tank was cooled to 22° C. to crystallize out about 31% of total crystals and the cooled oil was pressed immediately after introduced into the filter chambers.

The fractionated solid fraction had low heat resistance and was inferior in quality to a hard butter. The properties and yield ratio are shown in Table 5.

TABLE 5

|  | Iodine value | Melting point (°C.) | Yield ratio |
|---|---|---|---|
| Fatty material | 18.0 | 27.6 | — |
| Liquid fraction | 25.8 | 22.8 | 55.7 |
| Solid fraction | 8.21 | 31.6 | 44.3 |

TABLE 5-continued

|  | Iodine value | Melting point (°C.) | Yield ratio |
|---|---|---|---|
| fraction |  |  |  |

As seen from Table 5, precision of fractionation is very low.

REFERENCE EXAMPLE 3

According to the same manner as described in Example 2, fractionation of the fat treated by ethanol was carried out except that the fat introduced into the filter chamber was allowed to stand at room temperature (20° C.) for 5 hours without cooling by cold water, and then pressed. Yield of a solid fraction having a low iodine value was very low. The results are shown in Table 6.

TABLE 6

|  | Iodine value | Melting point (°C.) | Yield ratio |
|---|---|---|---|
| Fatty material | 54.5 | 32.5 | — |
| Liquid fraction | 60.3 | 19.2 | 67.4 |
| Solid fraction | 42.5 | 37.7 | 32.6 |

REFERENCE EXAMPLE 4

According to the same manner as described in Example 3, fractionation of soft palm oil was carried out except that the fatty material was cooled to 12° C. in the tank to thoroughly crystallize and then introduced into the filter chamber. As shown in Table 7, precision of fractionation is very low.

TABLE 7

|  | Iodine value | Melting point (°C.) | Yield ratio |
|---|---|---|---|
| Fatty material | 56.9 | 20.2 | — |
| Liquid fraction | 62.3 | — | 58.8 |
| Solid fraction | 49.2 | 26.5 | 41.2 |

What is claimed is:

1. A method for dry fractionation of a fatty material which comprises cooling the fatty material and then fractionating the material into a solid fraction and a liquid fraction, said cooling being carried out by introducing the fatty material in a fluid state into a filter chamber of a filter apparatus having pressing function and maintaining the fatty material therein at a crystal deposition temperature until a predetermined amount of crystals are formed, and pressing the filter chamber to fractionate said fatty material into the solid fraction and the liquid fraction.

2. The method according to claim 1, wherein a filter surface in the filter chamber is sealed with coagula of the fatty material.

3. The method according to claim 1, wherein the fatty material is introduced into the filter chamber at such a temperature that no crystals are deposited or, at most, 20% of the total crystals are deposited.

4. The method according to claim 1, wherein the filter apparatus has a diaphragm pressing means.

* * * * *